Patented Apr. 16, 1929.

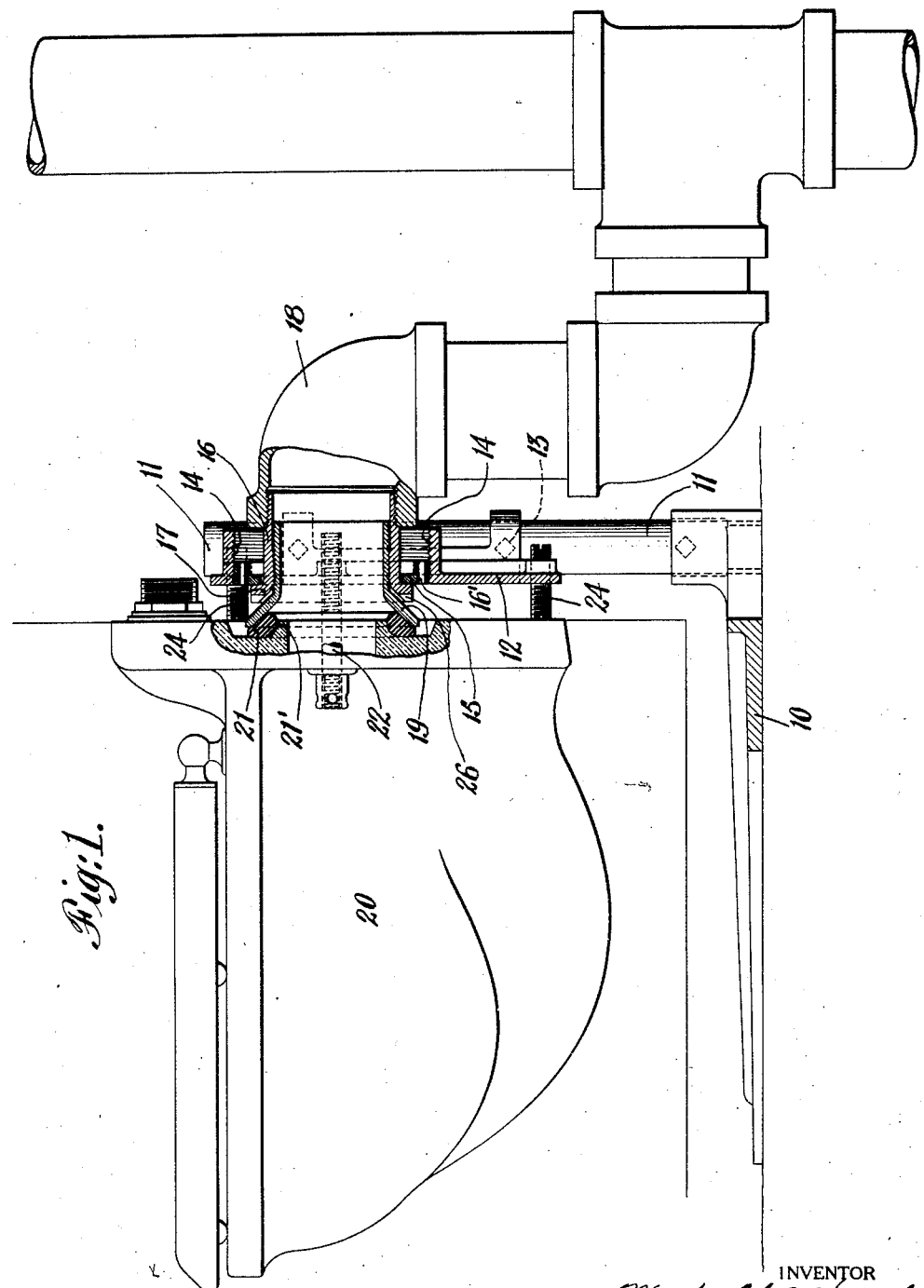

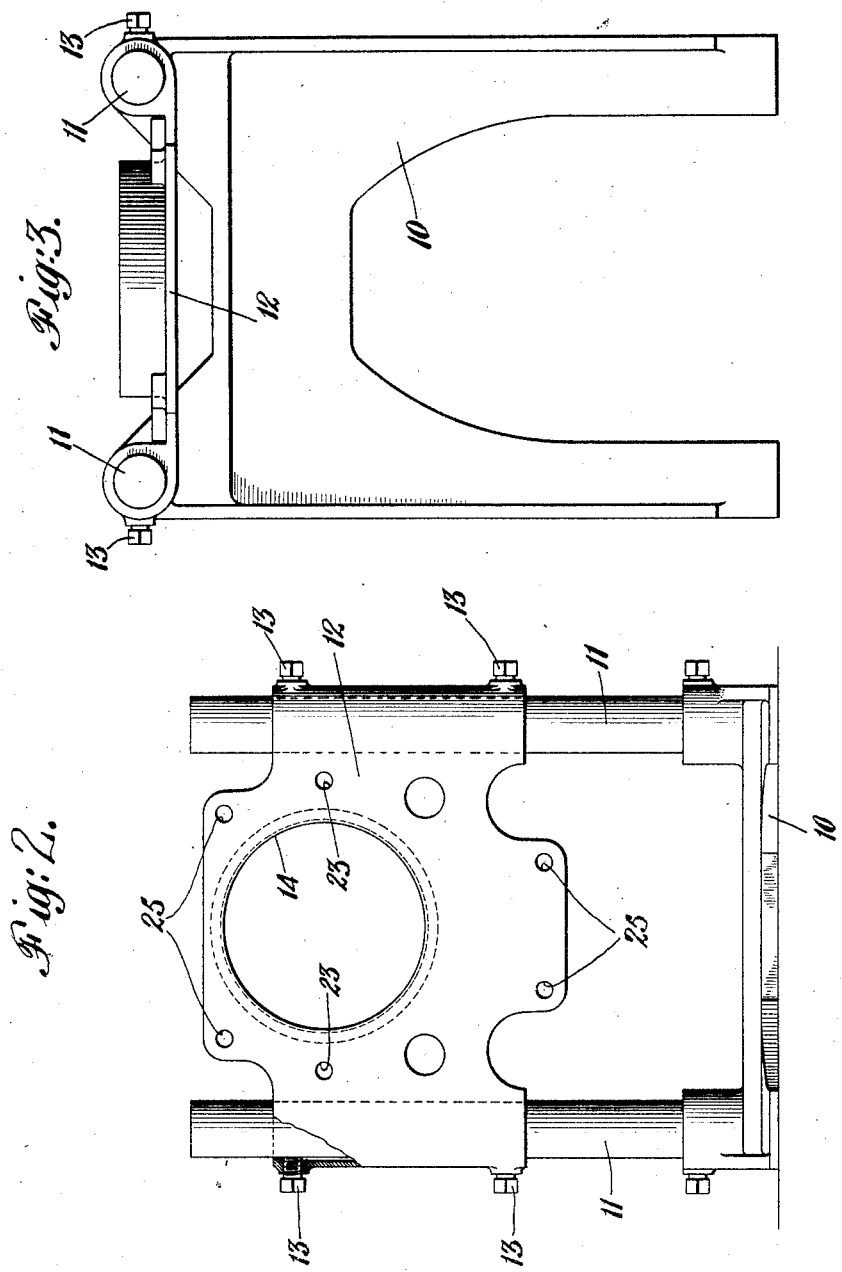

1,709,132

UNITED STATES PATENT OFFICE.

WINFIELD E. HINSDALE, OF TRENTON, NEW JERSEY, ASSIGNOR TO THE TRENTON POTTERIES COMPANY, OF TRENTON, NEW JERSEY, A CORPORATION OF NEW JERSEY.

WATER-CLOSET-BOWL SUPPORT.

Application filed May 12, 1928. Serial No. 277,137.

This invention relates to water-closet bowl supports and is an improvement upon the support shown in my Patent No. 1,043,834, Nov. 12, 1912.

The general object of my present invention is to provide a support for a closet of the wall hung type, which will carry the bowl independently of the wall, and with a minimum of strain upon the waste piping, while at the same time permitting the well known screw-threaded, or "Durham" connection to the waste piping.

More specific objects and advantages of my improved construction will appear more fully hereinafter.

In the drawing, which illustrates, as an example, one form which my invention may take, Fig. 1 is a side elevation partly in section, showing my improved support or carrier supporting a closet, Fig. 2 is a front elevation, of the carrier itself, and Fig. 3 is a plan view thereof.

As shown in the drawing, the carrier itself includes a floor plate 10, which may be bifurcated as shown and which is adapted to lie under the surface. Upstanding from the back of this floor plate 10 are the uprights 11. The carrier plate 12 is slidably mounted upon the uprights 11, the set screws 13 being provided for securing the plate to the uprights at any desired level.

The carrier plate 12 is provided with a threaded flanged opening 14 which is adapted to receive the externally threaded thrust ring 15. This ring is preferably provided on the front with one or more holes 16' for the temporary insertion of pins to facilitate its being rotated for fore-and-aft adjustment.

In the final assembly, as shown in Fig. 1, there is a threaded nipple 16 provided with a flange 17 at the front, the rear surface of which flange abuts against the thrust ring 15. The rear end of the nipple 16 is provided with a male screw which takes into the female screw at the end of the waste pipe elbow 18, thus producing the usual Durham fitting with the iron waste pipe, without the interposition of a lead bend. The forward portion of the nipple 16 is provided with a female screw with which the male screw on the adjustable funnel 19 engages.

The closet bowl 20 is provided with an outlet flange 21′, between which and the forward flared end of the funnel 19 the gasket 21 of rubber or other resilient material is interposed.

The closet bowl is held in place by the securing bolts 22 which take into the threaded openings 23, 23 of the carrier plate. The horizontal level of the bowl is adjusted and maintained by the jack screws 24, 24, which take into the threaded openings 25, 25, of the carrier plate.

Having described the various parts which go to make up my improved assembly, and their relationship to each other, I shall now describe the method of assembling them.

I start at the time when the waste pipe 18 has been put in place by the installers of the rough work, and before the floor surface has been applied or the wall built. It is then that the carrier is put in place, with the carrier plate adjusted to, and secured at, a level such that the horizontal center line of the opening 14 of the plate coincides with the horizontal center line of the opening of the elbow 18. The thrust ring 15 may be in place at this time.

The construction of the floors and walls may now be completed, it being understood, of course, that an opening is left in the wall through which the funnel 19 is to pass. This opening may be of generous size since it will be covered by the closet bowl.

For attaching the bowl, the next step may be the screwing of the nipple 16 into the elbow 18 to form a tight threaded joint at that point. To assist in the screwing home of this nipple its front face is preferably provided with slots 26 to permit of an iron cross or wrench operation. After this operation the thrust ring is advanced, by turning, until it abuts against the flange 17 of the nipple 16.

The funnel 19, with its rather fine thread covered with a red lead, or similar, mixture, is now screwed into the nipple 16, and positioned therein at a point determined by the position of the final wall surface against which the back of the closet is to abut. In determining the position of the funnel provision is made also for compressing the gasket 21 sufficiently to make a tight joint.

The closet may now be hung and secured in position by the bolts 22, the jack screws 24 being adjusted to provide the proper horizontal level.

It is to be particularly noted that in the construction above described, while I have attained an all-threaded or Durham connection between the funnel and the waste piping, and while the gasketed joint between the closet outlet and the funnel is positively maintained by the securing bolts 22, I avoid completely threaded or bolt connections between the waste piping and the bowl, and between the waste piping and the closet. The only screw connection to either the carrier or the bowl is that of the securing bolts 22 which hold these two parts together.

Thus I have provided a device which, while including all of the advantages of the Durham fitting, includes also adequate horizontal adjustment to take care of all ordinary variations in wall construction, and a resilient contact with the closet bowl through the interposed gasket, thus allowing for a considerable degree of shifting of the piping through thermal expansion or contraction without detriment to the carrier or bowl.

I have attained the unique combination of Durham connection with the waste piping with the support of the bowl upon a carrier which is not connected with the waste piping save through surface contact of two of the fittings.

While I have described the assembling of certain parts before the completion of the wall structure and certain parts after, it is to be understood that as much of the work of assembling as desired may be done before the completion of the wall structure, provided only that the final position of the funnel 19 and the securing and leveling of the bowl are left until after that has been accomplished.

The terms and expressions which I have employed are used as terms of description and not of limitation, and I have no intention, in the use of such terms and expressions, of excluding any equivalents of the features described, or portions thereof, but recognize that various modifications are possible within the scope of the invention claimed.

What I claim is:

1. Means for supporting a wall hung bowl and connecting its outlet to a horizontal opening in the waste piping, said means including in combination a carrier having a floor plate adapted to underlie the floor surface and a vertically extending portion adapted to underlie the wall and including a vertically adjustable member provided with an opening for alinement with the horizontal opening in the waste piping, a nipple adapted to pass through the opening in said vertically adjustable member and to be secured at its rear end by threaded engagement within the horizontal opening of the waste pipe, and provided adjacent the front end thereof with a flange, adjustable means connected to the vertically extending portion of the carrier adapted to be brought into contact with the rear surface of said flange, means for securing the bowl to the vertically extending portion of the carrier, and adjustable means adapted to be interposed between said nipple and the bowl outlet to complete the passage from the latter to the waste piping.

2. Means for supporting a wall hung bowl and connecting its outlet to a horizontal opening in the waste piping, said means including in combination a carrier having a floor plate adapted to underlie the floor surface and a vertically extending portion adapted to underlie the wall and including a vertically adjustable member provided with an opening for alinement with the horizontal opening in the waste piping, a nipple adapted to pass through the opening in said vertically adjustable member and to be secured at its rear end by threaded engagement within the horizontal opening in the waste piping and provided adjacent the front end thereof with a flange, a thrust ring adjustably mounted by screw threaded engagement within the opening in said vertically adjustable member and adapted to be brought into contact with the rear surface of said flange, means for securing the bowl to the vertically extending portion of the carrier, and adjustable means adapted to be interposed between said nipple and the bowl outlet to complete the passage from the latter to the waste piping.

3. Means for supporting a wall hung bowl and connecting its outlet to a horizontal opening in the waste piping, said means including in combination a carrier having a floor plate adapted to underlie the floor surface and a vertically extending portion adapted to underlie the wall and including a vertically adjustable member provided with an opening for alinement with the horizontal opening in the waste piping, a nipple adapted to pass through the opening in said vertically adjustable member and to be secured at its rear end by threaded engagement within the horizontal opening of the waste pipe, and provided adjacent the front end thereof with a flange, adjustable means connected to the vertically extending portion of the carrier adapted to be brought into contact with the rear surface of said flange, means for securing the bowl to the vertically extending portion of the carrier, adjustable means adapted to be interposed between said nipple and the bowl outlet to complete the passage from the latter to the waste piping, said last named means including a funnel in threaded engagement with said nipple, and a resilient gasket adapted to be interposed between the funnel and the bowl outlet, and means upon the vertically extending portion of the carrier for adjusting the horizontal level of the bowl.

4. Means for supporting a wall hung bowl and connecting its outlet to a horizontal opening in the waste piping, said means including in combination a carrier having a floor plate adapted to underlie the floor surface and a vertically extending portion adapted to underlie the wall and including a vertically adjustable member provided with an opening for alinement with the horizontal opening in the waste piping, a nipple adapted to pass through the opening in said vertically adjustable member and to be secured at its rear end by threaded engagement within the horizontal opening in the waste piping and provided adjacent the front end thereof with a flange, a thrust ring adjustably mounted by screw threaded engagement within the opening in said vertically adjustable member and adapted to be brought into contact with the rear surface of said flange, means for securing the bowl to the vertically extending portion of the carrier, adjustable means adapted to be interposed between said nipple and the bowl outlet to complete the passage from the latter to the waste piping, and means upon the vertically extending portion of the carrier for adjusting the horizontal level of the bowl.

5. Means for supporting a wall hung bowl and connecting its outlet to a horizontal opening in the waste piping, said means including in combination a carrier having a floor plate adapted to underlie the floor surface and a vertically extending portion adapted to underlie the wall and including a vertically adjustable member provided with an opening for alinement with the horizontal opening in the waste piping, a nipple adapted to pass through the opening in said vertically adjustable member and to be secured at its rear end by threaded engagement within the horizontal opening in the waste piping and provided adjacent the front end thereof with a flange, a thrust ring adjustably mounted by screw threaded engagement within the opening in said vertically adjustable member and adapted to be brought into contact with the rear surface of said flange, means for securing the bowl to the vertically extending portion of the carrier, adjustable means adapted to be interposed between said nipple and the bowl outlet to complete the passage from the latter to the waste piping, said last named means including a funnel in threaded engagement with said nipple, and a resilient gasket adapted to be interposed between the funnel and the bowl outlet, and means upon the vertically extending portion of the carrier for adjusting the horizontal level of the bowl.

In testimony whereof, I have signed my name to this specification this 7th day of May, 1928.

WINFIELD E. HINSDALE.